United States Patent [19]

Richards et al.

[11] 4,070,101
[45] Jan. 24, 1978

[54] NARROWBAND WIDE FIELD OF VIEW OPTICAL FILTER

[75] Inventors: William E. Richards, El Cajon; John A. Trias, La Mesa, both of Calif.

[73] Assignee: The United States of America as represented by the Secretary of the Navy, Washington, D.C.

[21] Appl. No.: 719,779

[22] Filed: Sept. 2, 1976

[51] Int. Cl.² .......................... G02B 1/10; G02B 5/24
[52] U.S. Cl. .................................. 350/312; 252/300; 350/164; 350/316
[58] Field of Search ......................... 350/312, 316; 252/300 R

[56] References Cited

U.S. PATENT DOCUMENTS 3,518,373   6/1970   Cushera et al. ................. 350/316 X

OTHER PUBLICATIONS

Ingersoll, "Liquid Filters for the Visible . . .", *Applied Optics*, vol. 10, No. 12, Dec. 1971, pp. 2781–2783.

*Primary Examiner*—John K. Corbin
*Assistant Examiner*—John D. Lee
*Attorney, Agent, or Firm*—R. S. Sciascia; G. J. Rubens; J. W. McLaren

[57] ABSTRACT

A wide angle narrowband optical filter is provided by an assembly in which a body member supports multiple absorption materials in a common optical path. Each of the multiple absorption materials contributes toward narrowing the spectral bandwidth region permitting transmittance of light energy. A bandpass glass color filter restricts light transmission to a relatively broad spectral range of approximately 250 nanometers and a selected coumarin dye material in solution used with a second solution of a selected rare earth material narrows the spectral range of transmittance. In a preferred embodiment an interference filter further narrows the transmitting bandwidth to approximately 12.5 nanometers at FWHM (measured at Full Width Half Maximum) in the spectral region which is desirably coincident with the wavelengths of light energy best transmitted in ocean waters.

5 Claims, 5 Drawing Figures

NARROWBAND WIDE FIELD OF VIEW OPTICAL FILTER

BACKGROUND OF THE INVENTION

It is been found that light energy of wavelengths between approximately 400 and 530 nanometers undergoes least attenuation in deep ocean waters. In the shallower coastal ocean waters of moderate depths light energy of the wavelengths of approximately 470 to 530 nanometers is least attenuated. Accordingly, for best transmittance of underwater light energy signals, a selected source having its principal peak energies near or at the 530 nanometer wavelength region is a preferable compromise between the attenuations imposed by both coastal ocean waters and deep ocean waters.

In such light energy signal systems emplpoying a source which will produce its peak energy outputs in the 530 nanometers spectral region, it is most desirable to employ filters which absorb substantially all of the background energy outside the 530 nanometer spectral bandwidth region.

Narrowband optical filters which are customarily in the present state of the art have some serious disadvantages however. For example, a multi-layer optical interference filter provides a relatively narrow bandwidth of transmission but, the transmissivity of light energy through such a interference filter is drastically altered with the change of angle of incidence of the light energy entering the filter. This shift may be calculated by the following formula:

$$\lambda_\phi = \lambda_o(\sqrt{1 - (\sin^2\phi/n^2)})$$

$\lambda_\phi$ = peak wavelength at angle
$\lambda_0$ = peak wavelength at normal incidence
$\phi$ = angle of incidence
$n$ = effective index of refraction of the filter For example, for $n = 1.6$ at 35° incidence, the shift to shorter wavelengths is around 36 nanometers with significant decrease in the optical transmission of the filter. Consequently, assuming $N = 1.6$ at a 35° angle of incidence, the shift of the bandwidth permitting transmittance will be to a shorter wavelength region by about 36 nanometers with an accompanying significant decrease in the overall optical transmission of the filter.

Another form of narrowband optical filters are the Fabry-Perot etalons. Although this type of filters can provide narrow transmittance bandwidths, they can only be most effectively employed where strong, extremely well-collimated light signals are received. Moreover, this type of filter is also very strongly temperature dependent in that their transmittance bandwidth can be shifted and altered radically as a result of significant shifts in temperature.

Grating spectrometers have also been employed as narrowband optical filters. However, this type of filter has relatively high resolution in the visible wavelength region but very small acceptance angles and extremely narrow entrance slits. Moreover, grating spectrometer type of filters are relatively large and expensive which is an undesirable disadvantage.

The Christiansen filter also provides narrowband optical filtering. This type of filter is made up of a solid pack of optical glass particles (approximately 0.5 to 2.0mm in size) in a glass cell with the glass particles immersed in a liquid of similar index of refraction but with a widely different dispersion isolating the narrow spectral regions. In the spectral region where the indices of the solid particles and the liquid are the same, a beam of light will be transmitted with little loss; where the indices differ, however, the light will be scattered out of the beam. A significant disadvantage of this type of filter is its extreme sensitivity to slight temperature changes. This problem results from the fact that the refractive index of the liquid changes more rapidly with its temperature in comparison with the refractive index change of the glass particles. Accordingly, the percentage transmission at the peak wavelength decreases as the number of interfaces in the filter is increased and therefore the wavelengths of light energy transmitted by the filter will vary considerably.

The birefringent Lyot type of filter also provides narrowband optical transmittance. This type of filter makes use of the rotation of polarization for wavelength selection and has a very narrowband resolution of 0.5A. Undesirably, however, this type of filter has a relatively restrictive acceptance angle of only several degrees and requires a temperature control to within 0.5° C.

Optical filtering is also provided by a selective specular reflection type of filter employing metallic vapors. However, this type of filter is required to be maintained at several hundred degrees centigrade to sustain vapor temperature and provides only an acceptance angle of a few degrees.

The resonance fluorescence filter is based on the employment of selective absorption and reradiation of the received signal in the form of fluorescence. This technique requires an oven or cathodic sputtering in an electric discharge to maintain the required vapor pressure of a selected material such as sodium, for example, which may be used as the resonance detector. Undesirably, the associated required power supply adds to its complexity as well as expense and size, all of which contribute significant disadvantages.

The acousto-optic phenomena can also be employed to provide narrowband optical filtering. This type of filter customarily comprises a crystalline solid material which functions as a tunable device responsive to the change of frequency of an applied electrical signal to vary the frequency of a resultant electric field. One type of acousto-optical tunable filter employs a collinear configuration. More recently, a newer type of tunable acousto-optic filter has been devised employing a noncollinear acousto-optical configuration. Although this latter type of acousto-optic filter configuration holds much potential for future use, its costs as well as advantages and disadvantages are not clearly defined, nor well known for practical applications at this time.

It is highly desirable for use in underwater ocean optical signal systems that a wide-angle, narrowband optical filter be devised which is small in size, compact and rugged in construction, and economical to fabricate, as well as convenient to use.

SUMMARY OF THE INVENTION

It is been found that some organic dye materials in solution exhibit relatively sharp absorption cut-offs at the long wavelength side of their absorption bands. Certain rare earth salt solutions were found to exhibit absorption spectra which overlap those of selected coumarin dye solutions, for example. When very concentrated solutions at or near the saturation point were employed, their absorption spectra may be enhanced for purposes of providing elements of a wide angle narrowband optical filter. When a conventional glass filter exhibiting selected predeterminable absorption characteristics is added to the functional absorption element of selected solutions as suggested previously, additional portions of the red and deep blue portions of the resultant transmitting spectral region may be rejected and a relatively very narrow, sharply confined transmittance bandwidth is provided.

The present invention contemplates multiple absorption materials positioned and supported in a common optical path to provide a wide-angle optical filter for restricting transmittance of light energy signals substantially to a wavelength spectral region having a narrow bandwidth of the order of approximately 12.5 nanometers FWHM (Full Width, Half Maximum).

At least two of the absorption materials employed in accordance with the concept and teaching of the present invention may comprise selected materials in liquid solution. One such material may comprise a selected amino coumarin dye dissolved in dimethylformamide. A second solution may comprise a rare earth salt, such as holmium nitrate, in a near-saturated concentration contained and supported in the same common optical path as the dye solution.

A bandpass glass color filter for rejecting the red and deep blue ends of the spectral distribution of light energy may also be employed. In a preferred embodiment of the present invention a conventional interference filter of specific transmittance and characteristics may also be employed to reject any parasitic transmission peak lying outside the desired narrowband transmittance region, such as the narrowband 520 nanometer wavelength spectral region for use in ocean water optical signal systems.

In accordance with the concept of the present invention, the combination of such multiple absorption materials may be readily incorporated into a compact body member which is rugged in construction and may be inexpensively fabricated for supporting the multiple absorption materials in a common optical path for convenient use as a narrowband wide-angle optical filter.

Accordingly, it is a primary object of the present invention to provide a wide-angle optical filter for restricting transmittance of light energy to a selected narrowband wavelength spectral region.

A concomitant important object of the present invention is to provide such a wide-angle narrowband optical filter which obviates most of the operating disadvantages of prior art filters having comparable functional characteristics.

Another important object of the present invention is to provide such a wide-angle narrowband optical filter having operative characteristics which are virtually unchanged within an extremely wide variation of the angle of incidence of the light signals to be filtered.

Yet another important object of the present invention is to provide such a wide angle narrowband optical filter which requires a minimum of maintenance.

A further object of the present invention is to provide such a wide angle narrowband optical filter which is adapted to change of its spectral band of maximum transmittance by change of liquid absorption materials intercepting the light energy signals to be filtered.

These and other features, objects, and advantages of the present invention will be better appreciated from an understanding of the operative principles of a preferred embodiment as described hereinafter and as illustrated in the accompanying drawings.

DESCRIPTION OF THE PREFERRED EMBODIMENTS

Figure 1:
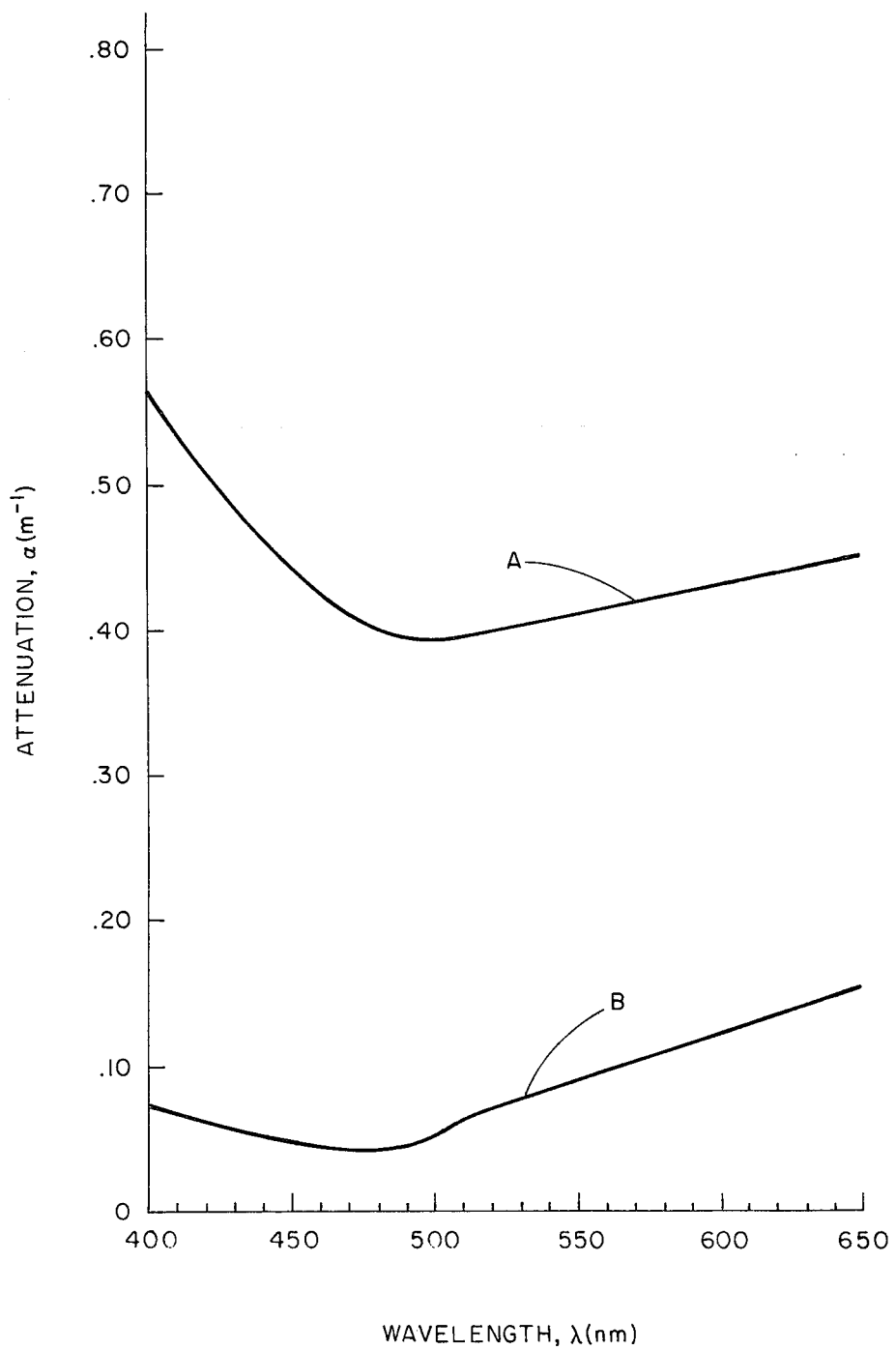
FIG. 1 is a graphical illustration of the relative spectral attenuation of ocean waters.

The absorption spectra of organic dyes and certain inorganic salts dissolved in a suitable solvent may be determined accurately by measurement through the use of a spectrophotometer, for example. It is been found that some organic dye materials desirably exhibit relatively sharp absorption cut-offs at the longer wavelength end of their absorption bands. Organic dye molecules possessing several conjugated bonds have high absorption in the visible spectrum. However, the electronic levels of the conjugated double bond "chain" are broadened by vibrations of the change. This is believed to be due to the neighboring atoms in the molecule through resonance interaction; depending upon the dye structure, the length of the conjugated chain, dye concentration, and the solvent used, it is possible to shift these absorption bands throughout most, if not all, of the visible spectral region. But it has been found that isolating a relatively narrow spectral transmission band at a desired wavelength peak is not readily achieved through the sole use of a family of volcanic dye materials. Accordingly, other absorption materials are employed in order to achieve the relatively narrow spectral transmission band which is desired.

For example, a conventional color glass filter may be employed to reject wavelengths of light energy in the red and deep blue end of the spectral region.

Additionally, it has been discovered that another group of compounds may be used to narrow the spectral transmission band, namely a suitable solution of rare earth salts. The absorption spectra of these compounds contribute significantly to achieving desired preselected narrowband transmission spectra.

Most of the ions of a number of trivalent rare earth in solution exhibit extremely sharp absorption bands in the visible spectrum. The "valence" electrons of the rare earth ions responsible for the absorption are in inner orbits protected by outer electrons so that the wave functions of the electrons of neighboring atoms do not overlap. Moreover, the 4f orbits of the rare earth ions lie well inside the electronic shell and are therefore protected from solvent interaction.

The concept of the present invention achieves the restriction of light energy transmission to a very narrow bandwidth at a predetermined wavelength region by employing the overlapping absorption spectra of a coumarin dye solution with the overlapping absorption spectra of a rare earth salt solution. Both of these solutions are preferably employed in very concentrated form at or near the saturation point to enhance their absorbences.

Additionally, a color glass filter is added to the optical path in which the solutions are supported, and performs the function of rejecting a portion of the red and deep blue spectral regions.

In a preferred embodiment of the present invention a filter element in the form of a multi-layer interference filter may be added to absorb those wavelengths of light energy falling within a parasitic transmission peak not otherwise blocked by the three other elements which comprise the composite filter.

FIG. 1 illustrates the spectral attenuation of ocean waters. Curve A shows the relative spectral attenuation of coastal waters of approximately 25 to 30 meters in depth; curve B illustrates the relative spectral attenuation of deep ocean waters of approximately 2000 meters in depth.

As is clearly evident from FIG. 1, ocean waters of moderate depth, as represented by coastal waters approximating 25 to 30 meters in depth, exhibit minimal attenuation of light energy having approximately 520 nanometers wavelength; it is equally evident that deep ocean waters exhibit much less attenuation than coastal waters generally, and, moreover, 520 nanometer wavelength light energy is not more significantly attenuated in deep ocean waters than the optimal transmittance for deep ocean waters which occur at about 480 nanometer wavelength light energy.

Accordingly, an optical filter which is designed to operate in an extremely narrowband at approximately a 520 nanometer spectral region will not only be highly useful in optical systems employed in coastal waters, but will possess operable characteristics which are quite acceptable for use in connection with optical systems operating in deep ocean waters, though not precisely optimal for the latter use.

Figure 2:
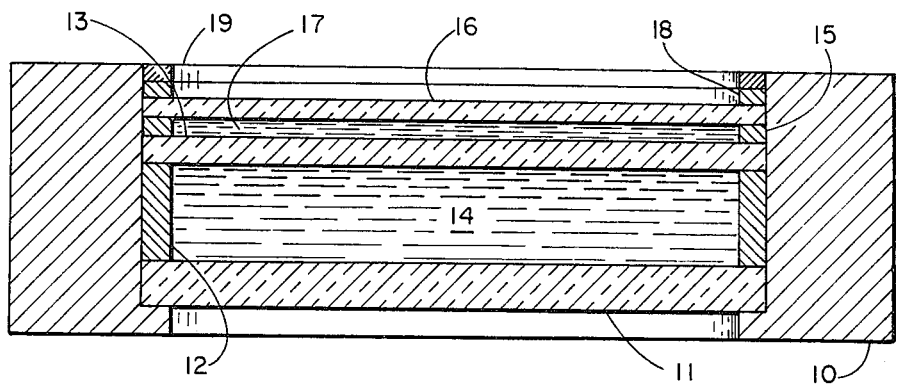
FIG. 2 is a cross-sectional view of the optical filter assembly of the present invention.
Figure 3:
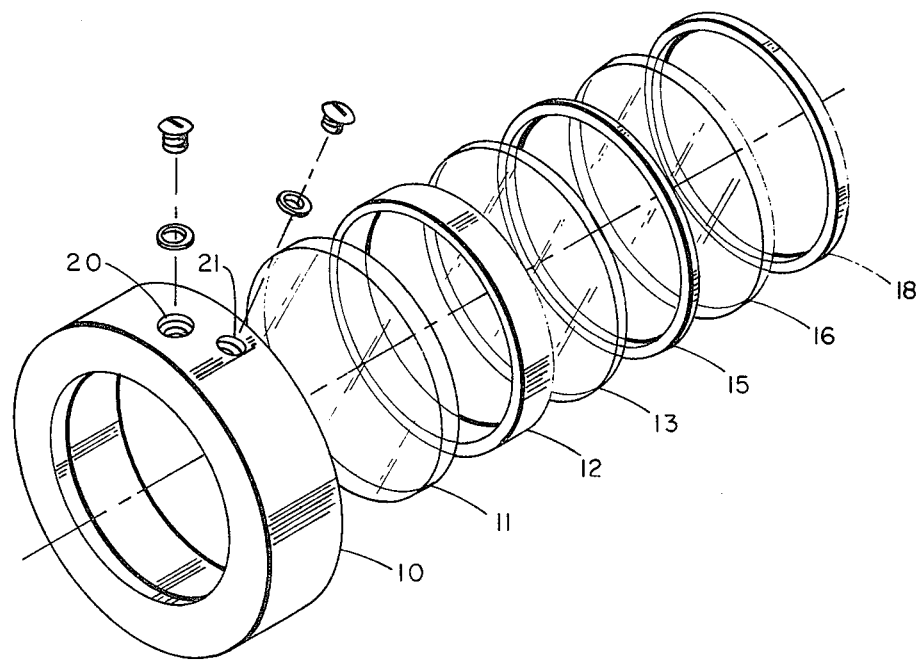
FIG. 3 is an isometric exploded view of the embodiment illustrated cross-sectionally in FIG. 2.

FIG. 2 is a cross-sectional view of an embodiment of the present invention, while FIG. 3 is an isometrically exploded view of the same embodiment as illustrated in FIG. 2. The same numerical designations are applied to like elements of the embodiment illustrated in both FIGS. 2 and 3.

In FIG. 2 a body member 10 may be fabricated of aluminum or other suitable material in a generally cylindrical configuration to receive circular elements within an inner recessed portion. As illustrated in FIGS. 2 and 3, a color glass filter 11 is supported against an embossment of the body member 10 within its inner cylindrical recess. A spacer ring 12 (which may be fabricated of aluminum or other suitable material) maintains a predetermined spacing between the color glass filter element 11 and a glass disk separator 13.

In a preferred embodiment of the present invention the volume between the color glass filter element 11 and the glass disk separator 13 is filled with a concentrated solution 14 of a selected rare earth salt, such as holmium nitrate, which is characterized by its very strong absorption band in the 540 nanometers wavelength region.

Adjacent to the glass disk separator 13 a second ring spacer 15 is positioned within the inner recess of the body member 10 and an interference filter 16 characterized by causing the subtractive cancellation of substantially all the longer wavelengths of light energy above approximately the 550 nanometer spectral region is supported in the optical path of the body member 10. The volume between elements 13 and 16 is filled with a concentrated solution 17 of a selected amino coumarin dye 17 characterized for its ability to absorb substantially all the shorter wavelengths of light energy below the 510 nanometer spectral region. An additional spacer 18 and a retaining means 19 complete the assembly of the filter.

As best shown in FIG. 3, ports 20 and 21 are situated in the body member 10 to provide access for filing the volume of cavities 14 and 17, respectively, with the concentrated solutions as previously described.

Figure 4:
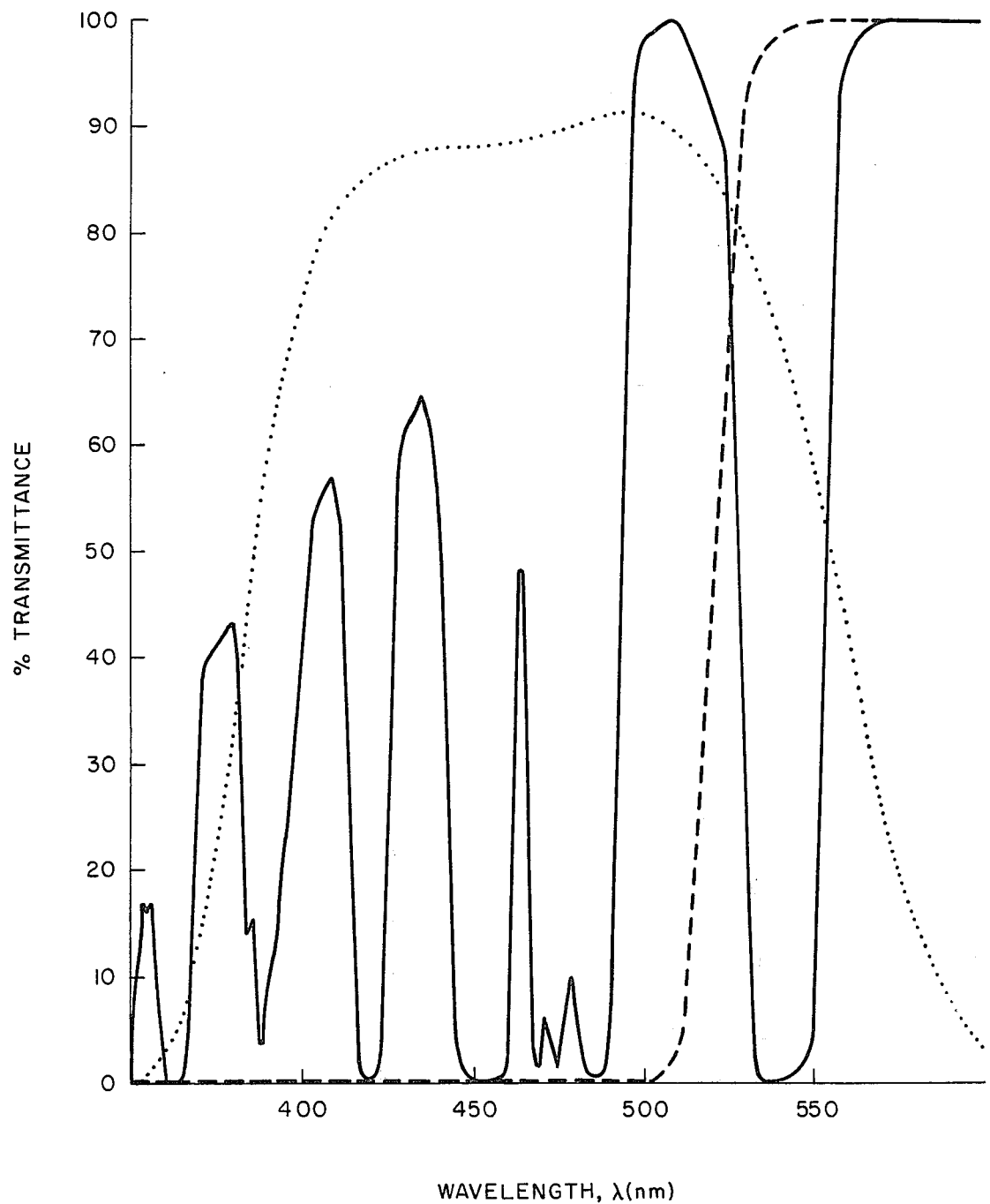
FIG. 4 is a graphical illustration of overlapping transmission spectra of multiple absorption materials aligned in a common optical path.

FIG. 4 is a graphical illustration of the relative absorption-transmittance properties of several of the elements incorporated in combination in the assembly of the optical filter of the present invention as illustrated in FIGS. 2 and 3. In FIG. 4 the solid line represents the absorption characteristic of a concentrated solution of a selected rare earth salt such as holmium nitrate, for example.

The dotted curve represents the absorption characteristic of a suitable color glass filter as employed within the concept and teaching of the present invention which may take the form of a Corning bandpass glass filter (#9782,C4-96) to reject the red and a portion of the deep blue end of spectrum.

The dash line curve shown in FIG. 4 represents the absorption characteristics of a suitable concentrated solution of a selected coumarin dye as taught by the present invention which may take the form of an amino coumarin 6 dye dissolved in dimethyl formamide which functions to absorb substantially all light energy within a 530–555 nanometer wavelength band.

Figure 5:
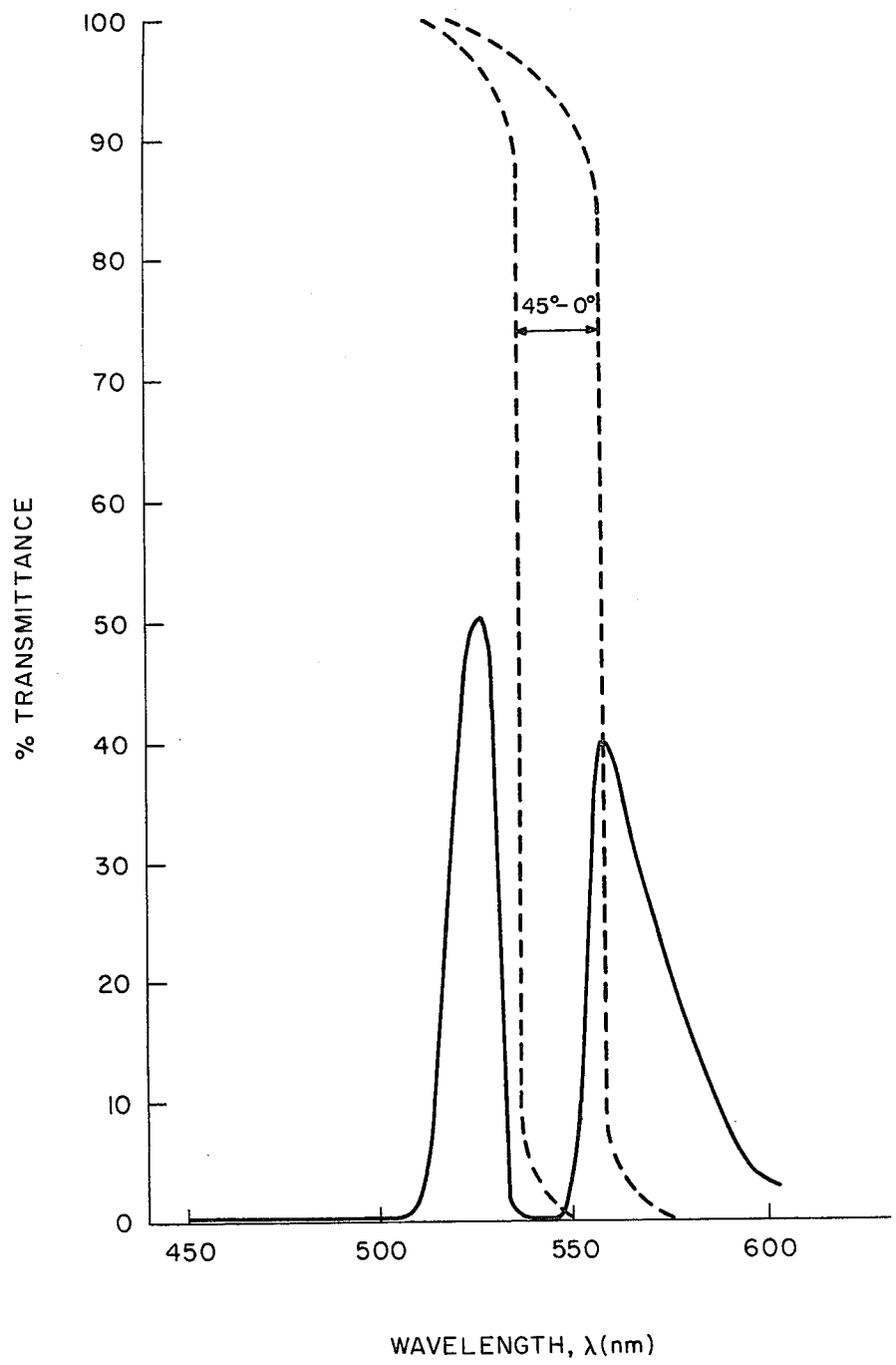
FIG. 5 is a graphical representation of the narrowband transmittance achieved by employing multiple absorption materials exhibiting the operative characteristics illustrated in FIG. 4 with the addition of a selected interference filter.

FIG. 5 illustrates the composite transmission characteristics resultant from the combination of the three elements whose absorption and transmittance characteristics are illustrated in FIG. 4. It will be noted that there is a primary transmission peak at approximately 530 nanometers wavelength and also a parasitic transmission peak having maximum transmittance at approximately 560 nanometer wavelength.

By the addition of a suitable interference filter which is designed to cause subtractive cancellation of substantially all longer wavelengths of light energy above the 550 nanometer spectral region, the parasitic transmission peak, as illustrated in FIG. 4, is effectively diminished desirably leaving substantially only the primary transmission peak having its maximum transmittance at or about the 530 nanometer wavelength region.

The dash lines in the illustration of FIG. 5 illustrate the wavelength shift which takes place in the operation of the interference filter in response to varying angle of incidence of the light received by the filter. As shown in FIG. 5 this variance, covering a change from 0° to 45° angle of incidence, changes the subtractive cancellation function of the interference filter favorably with respect to the elimination of the parasitic transmission peak as the angle of incidence of light received by the filter deviates from 0° or substantial alignment with the optical axis of the filter.

Thus, it may be appreciated by those skilled and knowledgeable in the pertinent arts that the optical filter of the present invention is comprised of multiple absorption elements, all of which except for the interference filter, are insensitive to changes in the angle of incidence of the received light energy. However, even the interference filter which is sensitive to variation in the angle of incidence of the received light energy, changes in a direction to desirably eliminate the remaining light energy which may be transmitted through a parasitic transmission peak as illustrated in FIG. 5.

Accordingly, the present invention provides a greatly improved optical filter which is particularly useful in underwater optical systems operative at or about the "ocean window" spectral region.

Moreover, the filter of the present invention eliminates the need for associated electrical power sources, avoids the use of poisonous vapors, does not require heating elements to maintain a particular temperature range, and additionally is small, compact, economical to fabricate, and convenient to use.

Further, a most important aspect of the present invention is that its use of selected concentrated solutions to perform filtering functions renders it readily adaptable to the quick and easy substitution of different solutions as may be desired to achieve optical filtering with respect to different wavelength regions. Thus, the operative characteristics of the filter of the present invention may be readily and quickly changed by the substitution of such selected solutions.

One preferred embodiment of the present invention provided maximum transmission at 525 nanometers and had a FWHM bandwidth of 12.5 nanometers. It provided a 90° field of view with a clear aperture 2.75 inches in diameter, all combined in a compact, rugged structure fabricated at low cost.

Obviously many modifications and variations of the present invention are possible in the light of the above teachings. It is therefore to be understood that within the scope of the appended claims the invention may be practiced otherwise than as specifically described.

What is claimed is:

1. A wide-angle optical filter for restricting transmittance of light energy substantially to a narrow band 520 nanometer wavelength spectral region comprising:
   a body member for supporting and containing multiple absorption materials in a common optical path;
   a bandpass glass color filter supported in said body member for restricting transmission along said common optical path to wavelengths of light energy substantially within a 340–600 nanometer spectral range;
   a concentrated solution of amino coumarin dye supported in said body member for absorbing substantially all shorter wavelengths of light energy transmitted along said common optical path below 510 nanometers within said spectral range; and
   a concentrated solution of a selected rare earth salt supported in said body member for absorbing substantially all light energy transmitted along said common optical path within a 530–550 nanometer wavelength band of said spectral range.

2. A wide-angle optical filter as claimed in claim 1 wherein said selected rare earth salt is holmium nitrate.

3. A wide-angle optical filter as claimed in claim 1 and including an interference filter supported in said body member for the subtractive cancellation of substantially all longer wavelengths of light energy above the 550 nanometer spectral region of said spectral range.

4. A wide-angle optical filter as claimed in claim 1 wherein said amino coumarin dye comprises coumarin 6.

5. A wide-angle optical filter as claimed in claim 1 wherein said amino coumarin dye is dissolved in dimethylformamide.

* * * * *